United States Patent
Qu et al.

(10) Patent No.: US 12,538,282 B2
(45) Date of Patent: Jan. 27, 2026

(54) COMMUNICATION METHOD AND RELATED APPARATUS

(71) Applicant: HUAWEI TECHNOLOGIES CO., LTD., Guangdong (CN)

(72) Inventors: Weilin Qu, Beijing (CN); Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 18/170,667

(22) Filed: Feb. 17, 2023

(65) Prior Publication Data

US 2023/0209522 A1  Jun. 29, 2023

Related U.S. Application Data

(63) Continuation of application No. PCT/CN2021/113633, filed on Aug. 19, 2021.

(30) Foreign Application Priority Data

Aug. 21, 2020 (CN) ......................... 202010851014.X

(51) Int. Cl.
 *H04W 72/0453* (2023.01)
(52) U.S. Cl.
 CPC ................ *H04W 72/0453* (2013.01)
(58) Field of Classification Search
 CPC ......... H04W 72/0453; H04W 52/0206; H04W 52/0216; H04W 52/0254; H04W 52/0258;
 (Continued)

(56) References Cited

U.S. PATENT DOCUMENTS

2017/0373900 A1* 12/2017 Adhikary .............. H04L 5/0048
2018/0139084 A1*  5/2018 Jung .................... H04L 27/2613
(Continued)

FOREIGN PATENT DOCUMENTS

CN   111464274 A   7/2020
CN   111464954 A   7/2020
(Continued)

OTHER PUBLICATIONS

3GPP TSG RAN WG1 Meeting #86bis, R1-1609818,NR SS Design for Wideband and Narrowband UEs,Sierra Wireless, Lisbon, Portugal Oct. 10-14, 2016, total 6 pages.
(Continued)

*Primary Examiner* — Yu-Wen Chang

(57) ABSTRACT

A communication method and a related apparatus are disclosed. The method includes: receiving a first signal on a first frequency domain resource and a first time unit, where the first signal is a primary synchronization signal or a secondary synchronization signal, the first signal includes at least two signals, the at least two signals includes a second signal and a third signal, the second signal is mapped to a second frequency domain resource, the third signal is mapped to a third frequency domain resource, and the second frequency domain resource and the third frequency domain resource are located in the first frequency domain resource; and performing signal detection on the first time unit based on at least one of the at least two signals.

16 Claims, 6 Drawing Sheets

(58) Field of Classification Search
CPC ........... H04W 52/028; H04W 56/0015; H04W 24/02; H04W 52/0248; H04W 56/00; Y02D 30/70
See application file for complete search history.

(56) References Cited

U.S. PATENT DOCUMENTS

| | | | |
|---|---|---|---|
| 2019/0320440 A1 | 10/2019 | Tang et al. | |
| 2020/0120624 A1* | 4/2020 | Lin | H04W 72/53 |
| 2020/0396722 A1* | 12/2020 | Han | H04L 5/0094 |
| 2021/0111824 A1* | 4/2021 | Park | H04J 11/0076 |
| 2021/0168806 A1* | 6/2021 | Mangalvedhe | H04L 5/0039 |
| 2022/0007315 A1* | 1/2022 | Su | H04L 5/005 |

FOREIGN PATENT DOCUMENTS

| | | |
|---|---|---|
| CN | 111465022 A | 7/2020 |
| CN | 111918395 A | 11/2020 |
| EP | 3605886 A1 | 2/2020 |
| WO | 2020009553 A1 | 1/2020 |

OTHER PUBLICATIONS

3GPP TS 38.211 V16.2.0: "3rd Generation Partnership Project; Technical Specification Group Radio Access Network; NR; Physical channels and modulation (Release 16)", Jun. 2020, total 131 pages.

International Search Report and Written Opinion issued in PCT/CN2021/113633, dated Nov. 17, 2021, 8 pages.

Office Action issued in IN202317018958, dated Jan. 3, 2024, 7 pages.

* cited by examiner

COMMUNICATION METHOD AND RELATED APPARATUS

CROSS-REFERENCE TO RELATED APPLICATIONS

This application is a continuation of International Application No. PCT/CN2021/113633, filed on Aug. 19, 2021, which claims priority to Chinese Patent Application No. 202010851014.X, filed on Aug. 21, 2020. The disclosures of the aforementioned applications are hereby incorporated by reference in their entireties.

TECHNICAL FIELD

The present disclosure relates to the field of communications technologies, and in particular, to a communication method and a related apparatus.

BACKGROUND

In the field of communications technologies, a synchronization signal includes a primary synchronization signal (PSS) and a secondary synchronization signal (SSS). The PSS, the SSS, and a physical broadcast channel (PBCH) form a synchronization signal block (SSB). In new radio (NR), an SSB includes 20 resource blocks (RBs), and includes 240 consecutive subcarriers (which are numbered 0 to 239) in frequency domain. A PSS and an SSS each occupy one symbol in time domain, occupy 128 subcarriers in frequency domain, and include 12 RBs. In an existing solution, a narrowband terminal device needs to detect a received synchronization signal. It can be learned that if the synchronization signal occupies a large quantity of resource blocks, energy consumption needed by the narrowband terminal device to detect the synchronization signal is large. Therefore, how to enable the narrowband terminal device to reduce energy consumption of detecting a PSS and an SSS is an urgent problem to be resolved.

SUMMARY

The present disclosure provides a communication method and a related apparatus. When embodiments of the present disclosure are implemented, energy consumption when a narrowband terminal device detects a synchronization signal can be reduced.

According to a first aspect, a communication method is provided. The method includes:
receiving a first signal on a first frequency domain resource and a first time unit, where the first signal is a primary synchronization signal or a secondary synchronization signal, the first signal includes at least two signals, a second signal in the at least two signals in the first signal is mapped to a second frequency domain resource, a third signal in the at least two signals is mapped to a third frequency domain resource, and the second frequency domain resource and the third frequency domain resource are located in the first frequency domain resource; and
performing signal detection on the first time unit based on at least one of the at least two signals.

It can be learned that, in the foregoing technical solution, a terminal device performs signal detection on a time unit based on a synchronization signal obtained from an access network device and a locally generated synchronization signal. The terminal device may perform signal detection on the time unit based on at least one of the at least two signals. To be specific, a wideband terminal device may perform signal detection based on the first signal, and a narrowband terminal device may perform signal detection based on a sub-signal in the first signal. Therefore, access requirements of the wideband terminal device and the narrowband terminal device are compatible. In addition, because the narrowband terminal device may perform signal detection based on the sub-signal in the first signal, and the sub-signal occupies fewer resource blocks, energy consumption for the narrowband terminal device to detect a synchronization signal is reduced.

Optionally, the performing signal detection on the first time unit based on at least one of the at least two signals includes:
generating a fourth signal, where if the first signal is a primary synchronization signal, the fourth signal is a primary synchronization signal; or if the first signal is a secondary synchronization signal, the fourth signal is a secondary synchronization signal, where the fourth signal includes at least two signals, and the at least two signals include a fifth signal and a sixth signal;
mapping the fourth signal to a fourth frequency domain resource, where the fifth signal is mapped to a fifth frequency domain resource, the sixth signal is mapped to a sixth frequency domain resource, and the fifth frequency domain resource and the sixth frequency domain resource are located in the fourth frequency domain resource; and
performing signal detection on the first time unit based on at least one signal in the first signal and at least one signal in the fourth signal.

It can be learned that, in the foregoing technical solution, a terminal device locally generates a synchronization signal, so that the terminal device may perform signal detection on a time unit based on a synchronization signal obtained from an access network device and the locally generated synchronization signal. The terminal device may perform signal detection on the time unit based on at least one signal in the first signal and at least one signal in the fourth signal. To be specific, a wideband terminal device performs signal detection based on the first signal, and a narrowband terminal device performs signal detection based on a sub-signal in the first signal. Therefore, access requirements of the wideband terminal device and the narrowband terminal device are compatible. In addition, because the narrowband terminal device performs signal detection based on the sub-signal in the first signal, and the sub-signal occupies fewer resource blocks, energy consumption when the narrowband terminal device detects a synchronization signal is reduced.

Optionally, the fifth signal and the sixth signal are determined based on a same signal generator; or the fifth signal and the sixth signal are determined based on different signal generators.

Optionally, the fifth signal and the sixth signal are scrambled signals, and the fifth signal and the sixth signal correspond to different scrambling codes.

It can be learned that, in the foregoing technical solution, a locally generated signal is scrambled, so that a narrowband terminal device can successfully detect, on a time unit based on at least one signal in the first signal and at least one signal in the fourth signal, a signal that needs to be accessed. In addition, because the narrowband terminal device performs signal detection based on the sub-signal in the first signal, and the sub-signal occupies fewer resource blocks, energy consumption when the narrowband terminal device detects a synchronization signal is reduced.

Optionally, the mapping the fourth signal to a fourth frequency domain resource includes:

mapping the fifth signal to the fifth frequency domain resource in a third mapping manner, and mapping the sixth signal to the sixth frequency domain resource in a fourth mapping manner, where the third mapping manner is different from the fourth mapping manner.

It can be learned that, in the foregoing technical solution, for a locally generated signal, the signal is mapped to a corresponding frequency domain resource in a corresponding mapping manner, so that a narrowband terminal device can successfully detect, on a time unit based on at least one signal in the first signal and at least one signal in the fourth signal, a signal that needs to be accessed. In addition, because the narrowband terminal device performs signal detection based on the sub-signal in the first signal, and the sub-signal occupies fewer resource blocks, energy consumption when the narrowband terminal device detects a synchronization signal is reduced.

Optionally, a frequency spacing between the fifth frequency domain resource and the sixth frequency domain resource is a specified value, or is determined based on a frequency band in which the fourth signal is located.

It can be learned that, in the foregoing technical solution, a frequency spacing is set between adjacent frequency domain, to prevent a narrowband terminal device from incorrectly detecting an adjacent sub-signal when performing signal detection, so that the narrowband terminal device can successfully detect, on a time unit based on at least one signal in the first signal and at least one signal in the fourth signal, a signal that needs to be accessed. In addition, because the narrowband terminal device performs signal detection based on the sub-signal in the first signal, and the sub-signal occupies fewer resource blocks, energy consumption when the narrowband terminal device detects a synchronization signal is reduced.

According to a second aspect, an embodiment of the present disclosure provides a communication method. The method includes:

determining a first signal, where the first signal is a primary synchronization signal or a secondary synchronization signal, the first signal includes at least two signals, and the at least two signals include a second signal and a third signal;

mapping the first signal to a first frequency domain resource, where the second signal is mapped to a second frequency domain resource, the third signal is mapped to a third frequency domain resource, and the second frequency domain resource and the third frequency domain resource are located in the first frequency domain resource; and sending the first signal on the first frequency domain resource and a first time unit.

It can be learned that, in the foregoing technical solution, the first signal is mapped to the first frequency domain resource, the second signal is mapped to the second frequency domain resource, the third signal is mapped to the third frequency domain resource, and the first signal is sent, so that a wideband terminal device can subsequently perform signal detection based on the first signal, and a narrowband terminal device may perform signal detection based on a sub-signal in the first signal. Therefore, access requirements of the wideband terminal device and the narrowband terminal device are compatible. In addition, because the narrowband terminal device may perform signal detection based on the sub-signal in the first signal, and the sub-signal occupies fewer resource blocks, energy consumption for the narrowband terminal device to detect a synchronization signal is reduced.

Optionally, the second signal and the third signal are determined based on a same sequence generator; or the second signal and the third signal are determined based on different sequence generators.

Optionally, the second signal and the third signal are scrambled signals, and the second signal and the third signal correspond to different scrambling codes.

It can be learned that, in the foregoing technical solution, a signal is scrambled, so that a narrowband terminal device can successfully detect, on a time unit based on at least one signal in the first signal and at least one signal in the fourth signal, a signal that needs to be accessed. In addition, because the narrowband terminal device performs signal detection based on the sub-signal in the first signal, and the sub-signal occupies fewer resource blocks, energy consumption when the narrowband terminal device detects a synchronization signal is reduced.

Optionally, when mapping the first signal to a first frequency domain resource, the method comprises:

mapping the second signal to the second frequency domain resource in a first mapping manner, and mapping the third signal to the third frequency domain resource in a second mapping manner, where the first mapping manner is different from the second mapping manner.

It can be learned that, in the foregoing technical solution, a signal is mapped to a corresponding frequency domain resource in a corresponding mapping manner, so that a narrowband terminal device can successfully detect, on a time unit based on at least one signal in the first signal and at least one signal in the fourth signal, a signal that needs to be accessed. In addition, because the narrowband terminal device performs signal detection based on the sub-signal in the first signal, and the sub-signal occupies fewer resource blocks, energy consumption when the narrowband terminal device detects a synchronization signal is reduced.

Optionally, a frequency spacing between the second frequency domain resource and the third frequency domain resource is a specified value, or is determined based on a frequency band in which the first signal is located.

It can be learned that, in the foregoing technical solution, a frequency spacing is set between adjacent frequency domain, to prevent a narrowband terminal device from incorrectly detecting an adjacent sub-signal when performing signal detection, so that the narrowband terminal device can successfully detect, on a time unit based on at least one signal in the first signal and at least one signal in the fourth signal, a signal that needs to be accessed. In addition, because the narrowband terminal device performs signal detection based on the sub-signal in the first signal, and the sub-signal occupies fewer resource blocks, energy consumption when the narrowband terminal device detects a synchronization signal is reduced.

According to a third aspect, an embodiment of the present disclosure provides a communication apparatus. The communication apparatus is a chip or a terminal device including the chip. The apparatus includes a transceiver module and a processing module. The transceiver module performs a receiving and sending operation in the first aspect, and another operation is performed by the processing module.

For example, the transceiver module is configured to receive a first signal on a first frequency domain resource and a first time unit, where the first signal is a primary synchronization signal or a secondary synchronization signal, the first signal includes at least two signals, a second signal in the at least two signals in the first signal is mapped to a second frequency domain resource, a third signal in the at least two signals is mapped to a third frequency domain resource, and the second frequency domain resource and the third frequency domain resource are located in the first frequency domain resource; and the processing module is configured to perform signal detection on the first time unit based on at least one of the at least two signals.

Optionally, the processing module is configured to:

generate a fourth signal, where if the first signal is a primary synchronization signal, the fourth signal is a primary synchronization signal; or if the first signal is a secondary synchronization signal, the fourth signal is a secondary synchronization signal, where the fourth signal includes at least two signals, and the at least two signals include a fifth signal and a sixth signal;

map the fourth signal to a fourth frequency domain resource, where the fifth signal is mapped to a fifth frequency domain resource, the sixth signal is mapped to a sixth frequency domain resource, and the fifth frequency domain resource and the sixth frequency domain resource are located in the fourth frequency domain resource; and perform signal detection on the first time unit based on at least one signal in the first signal and at least one signal in the fourth signal.

Optionally, the fifth signal and the sixth signal are determined based on a same signal generator.

Optionally, the fifth signal and the sixth signal are determined based on different signal generators.

Optionally, the fifth signal and the sixth signal are scrambled signals, and the fifth signal and the sixth signal correspond to different scrambling codes.

Optionally, that the processing module is configured to map the fourth signal to a fourth frequency domain resource includes:

configured to map the fifth signal to the fifth frequency domain resource in a third mapping manner, and map the sixth signal to the sixth frequency domain resource in a fourth mapping manner, where the third mapping manner is different from the fourth mapping manner.

Optionally, a frequency spacing between the fifth frequency domain resource and the sixth frequency domain resource is a specified value, or is determined based on a frequency band in which the fourth signal is located.

According to a fourth aspect, the present disclosure provides a communication apparatus. The communication apparatus is a chip, or a device that includes the chip and that is configured to communicate with a terminal device. The communication apparatus includes a processing module and a transceiver module. The transceiver module performs a receiving and sending operation in the second aspect, and another operation is performed by the processing module.

For example, the processing module is configured to determine a first signal, where the first signal is a primary synchronization signal or a secondary synchronization signal, the first signal includes at least two signals, and the at least two signals include a second signal and a third signal;

the processing module is further configured to map the first signal to a first frequency domain resource, where the second signal is mapped to a second frequency domain resource, the third signal is mapped to a third frequency domain resource, and the second frequency domain resource and the third frequency domain resource are located in the first frequency domain resource; and the transceiver module is configured to send the first signal on the first frequency domain resource and a first time unit.

Optionally, the second signal and the third signal are determined based on a same sequence generator.

Optionally, the second signal and the third signal are determined based on different sequence generators.

Optionally, the second signal and the third signal are scrambled signals, and the second signal and the third signal correspond to different scrambling codes.

Optionally, that the processing module is configured to map the first signal to a first frequency domain resource includes:

configured to map the second signal to the second frequency domain resource in a first mapping manner, and map the third signal to the third frequency domain resource in a second mapping manner, where the first mapping manner is different from the second mapping manner.

Optionally, a frequency spacing between the second frequency domain resource and the third frequency domain resource is a specified value, or is determined based on a frequency band in which the first signal is located.

According to a fifth aspect, an embodiment of the present disclosure provides a communication apparatus, including a processor and a memory. The processor invokes a computer program stored in the memory to implement the method according to any one of the first aspect or the method according to any one of the second aspect.

According to a sixth aspect, an embodiment of the present disclosure provides a computer-readable storage medium. The computer-readable storage medium stores a computer program, and when the computer program is run, the method according to any one of the first aspect or the method according to any one of the second aspect is implemented.

According to a seventh aspect, an embodiment of the present disclosure provides a communication system. The communication system includes the communication apparatus in the third aspect and/or the communication apparatus in the fourth aspect.

BRIEF DESCRIPTION OF DRAWINGS

The following briefly describes accompanying drawings used in descriptions of embodiments.

DESCRIPTION OF EMBODIMENTS

Figure 1:
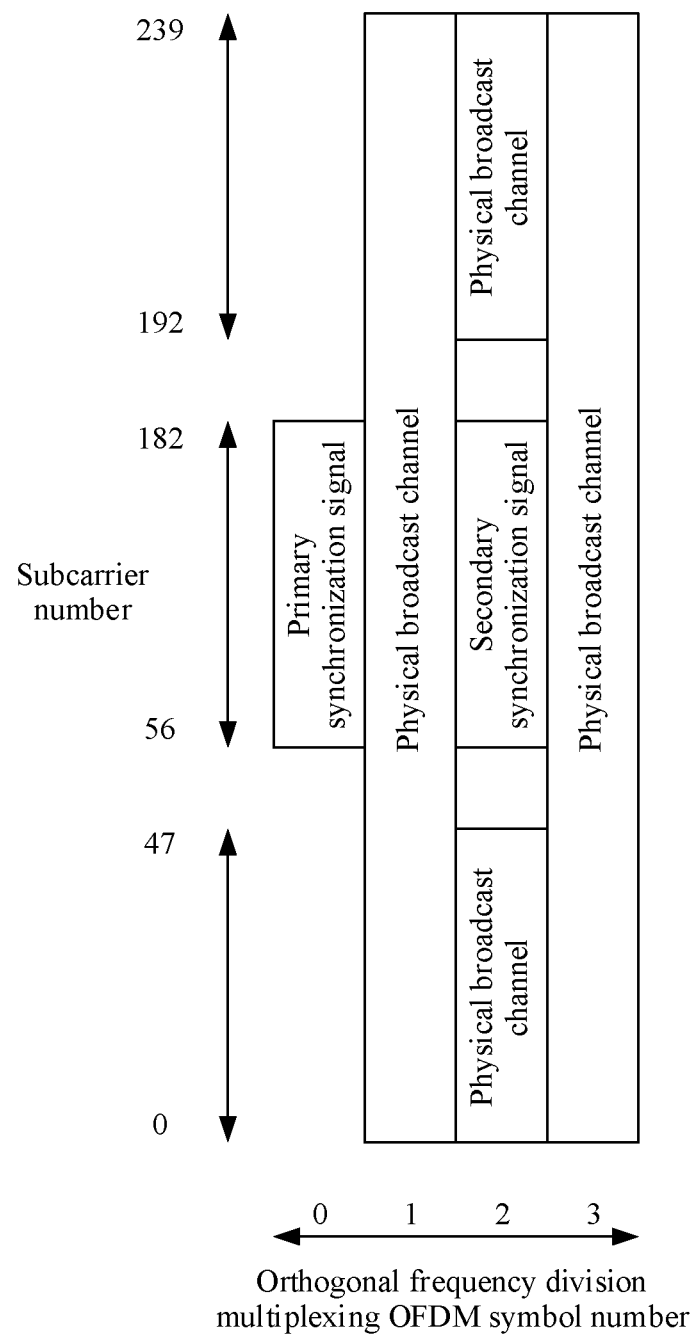
FIG. 1 is a schematic diagram of a synchronization signal block according to an embodiment of the present disclosure.

The following describes the technical solutions in embodiments of the present disclosure with reference to the accompanying drawings in embodiments of the present disclosure. The terms "system" and "network" may be used interchangeably in embodiments of the present disclosure. "/" represents an "or" relationship between associated objects unless otherwise specified. For example, A/B may represent A or B. The term "and/or" in the present disclosure is merely an association relationship for describing associated objects, and represents that any of three relationships may exist. For example, A and/or B may represent any of the three cases: Only A exists, both A and B exist, and only B exists, where A and B each may be singular or plural. In addition, unless otherwise specified, "a plurality of" in the descriptions of the present disclosure means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of the present disclosure, terms such as first and second are used in embodiments of the present disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Reference to "an embodiment", "some embodiments", or the like described in embodiments of the present disclosure means that one or more embodiments of the present disclosure include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In addition, a communication method provided in embodiments of the present disclosure is applicable to a plurality of system architectures. The network architecture and the service scenario described in embodiments of the present disclosure are intended to describe the technical solutions in embodiments of the present disclosure more clearly, and do not constitute a limitation on the technical solutions provided in embodiments of the present disclosure. A person of ordinary skill in the art may know that: With the evolution of the network architecture and the emergence of new service scenarios, the technical solutions provided in embodiments of the present disclosure are also applicable to similar technical problems.

The following describes some communication terms used in the present disclosure.

1. Subcarrier: In an orthogonal frequency division multiplexing (OFDM) system, a frequency domain resource is divided into several sub-resources, and each sub-resource in frequency domain may be referred to as a subcarrier. The subcarrier may also be understood as the smallest granularity of a frequency domain resource.

2. Resource block (RB): N consecutive subcarriers in frequency domain may be referred to as one RB. For example, one RB in an LTE system includes 12 subcarriers, and one RB in a 5G NR system also includes 12 subcarriers. With evolution of a communication system, a quantity of subcarriers included in one resource block may alternatively be another value. This is not limited in the present disclosure.

3. Slot: In a 5G NR system, one slot includes 14 OFDM symbols, a slot length corresponding to a 15-kHz subcarrier spacing is 1 ms, and a slot length corresponding to a 30-kHz subcarrier spacing is 0.5 ms. Certainly, with evolution of communications technologies, a quantity of OFDM symbols included in one slot may alternatively be another value. This is not limited in the present disclosure.

4. Subframe: A time length of one subframe in a 5G NR system is 1 ms. Certainly, with evolution of communications technologies, the time length of the subframe may alternatively be another value. This is not limited in the present disclosure.

The foregoing description briefly describes the meanings of some nouns (or terms) in embodiments of the present disclosure. To better understand a communication method provided in embodiments of the present disclosure, the following describes a system architecture and/or an application scenario of the communication method provided in embodiments of the present disclosure. It may be understood that scenarios described in embodiments of the present disclosure are intended to describe the technical solutions in embodiments of the present disclosure more clearly, and do not constitute a limitation on the technical solutions provided in embodiments of the present disclosure.

The technical solutions in embodiments of the present disclosure may be applied to a long term evolution (LTE) architecture, a 5th-generation mobile communication technology (5G), a 4.5th-generation mobile communication technology (4.5G), a wireless local area network (WLAN) system, and the like.

For ease of understanding the present disclosure, related technical knowledge included in embodiments of the present disclosure is described herein.

Currently, typical internet of things applications include a smart grid, smart agriculture, smart transportation, a smart household, environment detection, and the like. Generally, during application, the internet of things may involve scenarios from outdoor to indoor, from the ground to the underground, and the like. Therefore, many special requirements are imposed on the design of the internet of things. For example, a low-rate device such as a machine type communication (MTC) device is needed. There is a large quantity of MTC devices, application fields are wide, and there is a huge market prospect.

For an enhanced mobile broadband (eMBB) service, an ultra-reliable low-latency communication (URLLC) service, and a massive machine-type communications (mMTC) service, an MTC device designed for an NR system still has requirements for low energy consumption, low costs, a low rate, and enhanced coverage.

However, in an existing solution, a PSS and an SSS occupy one symbol in time domain, occupy 128 subcarriers in frequency domain, and include 12 RBs. Specifically, FIG. 1 is a schematic diagram of a synchronization signal block according to an embodiment of the present disclosure. As shown in FIG. 1, the $1^{st}$ orthogonal frequency division multiplexing (OFDM) symbol from the left carries a PSS, and subcarriers numbered 56 to 182 are subcarriers occupied by the PSS. The $2^{nd}$ OFDM symbol and the 4th OFDM symbol from the left carry PBCH. The $3^{rd}$ OFDM symbol from the left carries an SSS and PBCH, and subcarriers numbered 56 to 182 are set as the SSS. In other words, it can be learned that if a synchronization signal occupies a large quantity of resource blocks, a narrowband terminal device needs large power consumption when detecting the received synchronization signal. This does not comply with a requirement that an MTC device designed for an NR system still has low energy consumption. Therefore, how to enable the narrowband terminal device to reduce energy consumption of detecting a PSS and an SSS is an urgent problem to be resolved.

Based on this, embodiments of the present disclosure provide a communication method to resolve the foregoing problem. The following describes embodiments of the present disclosure in detail.

Figure 2:
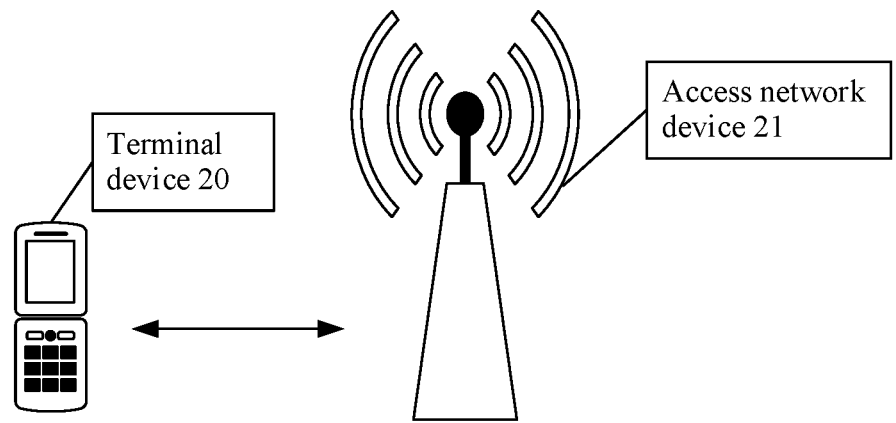
FIG. 2 shows a basic architecture of a communication system according to an embodiment of the present disclosure.

FIG. 2 shows a basic architecture of a communication system according to an embodiment of the present disclosure. As shown in FIG. 2, the communication system may include a terminal device 20 and an access network device 21. The terminal device 20 may communicate with the access network device 21.

In this embodiment, the terminal device 20 may be a chip, or may be user equipment including the chip. Further, the terminal device 20 is an entity that is on a user side and that is configured to receive a signal, send a signal, or receive and send a signal. The terminal device 20 is configured to provide one or more of a voice service and a data connectivity service for a user. It may be understood that when the terminal device 20 is the chip, the chip may include a processor and an interface. When the terminal device 20 is the user equipment including the chip, the terminal device 20 may be a device that includes a wireless transceiver function and that can cooperate with the access network device to provide a communication service for a user. Specifically, the terminal device 20 may be user equipment (UE), an access terminal, a subscriber unit, a subscriber station, a mobile station, a mobile console, a remote station, a remote terminal, a mobile device, a terminal, radio communications equipment, a user agent, or a user apparatus. Alternatively, the terminal device 20 may be an uncrewed aerial vehicle, an internet of things (IoT) device, a station (ST) in a WLAN, a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device, another processing device connected to a wireless modem, a vehicle-mounted device, or a wearable device (which may also be referred to as a wearable intelligent device). Alternatively, the terminal device 20 may be a device-to-device (D2D) device, for example, an electricity meter or a water meter. Alternatively, the terminal device 20 may be a terminal in a 5G system, or may be a terminal in a next-generation communication system. This is not limited in this embodiment.

In this embodiment, the terminal device 20 may support narrowband receiving and wideband receiving. Optionally, the terminal device 20 may be a wideband terminal device or a narrowband terminal device. Conditions that the wideband terminal device and the narrowband terminal device need to satisfy include but are not limited to the following:

1. In embodiments of the present disclosure, a maximum bandwidth capability of the narrowband terminal device is less than or equal to a minimum bandwidth capability of the wideband terminal device. For example, the narrowband terminal device is an NB-IoT terminal device, and the wideband terminal device is an LTE terminal device. A data transmission bandwidth of the NB-IoT terminal device is one RB, namely, 180 kHz or 200 kHz (including a guard band). Because a frequency domain resource occupied by a primary synchronization signal (PSS)/secondary synchronization signal (SSS) in an LTE system is six RBs, namely, 1.08 MHz or 1.44 MHz (including a guard band), the minimum bandwidth capability of the wideband terminal device may be considered to be greater than or equal to 1.08 MHz. In this case, it may be considered that the maximum bandwidth capability of the narrowband terminal device is less than or equal to the minimum bandwidth capability of the wideband terminal device. For another example, the narrowband terminal device is an NB-IoT terminal device, and the wideband terminal device is an NR terminal device. Based on a design of a synchronization signal block (SSB) of an NR system, a minimum bandwidth capability of the NR terminal device may be considered as 20 RBs, where each RB includes 12 subcarriers. In the NR system, a subcarrier spacing is related to a frequency band deployed in the NR system, and is not a fixed value. Using a minimum subcarrier spacing of 15 kHz as an example, the minimum bandwidth capability may be considered to be greater than or equal to 20*12*15=3.6 MHz. It may still be considered that the maximum bandwidth capability of the narrowband terminal device is less than or equal to the minimum bandwidth capability of the wideband terminal device.

2. In embodiments of the present disclosure, it may alternatively be considered that a minimum bandwidth capability of the narrowband terminal device is less than a minimum bandwidth capability of the wideband terminal device. If a data transmission channel is established between a terminal device and a network device, generally, the terminal device needs to first receive a synchronization channel and a broadcast channel that are sent by the network device. Therefore, it may be considered that a bandwidth corresponding to the synchronization channel and the broadcast channel that are sent by the network device is a minimum bandwidth capability that the terminal device needs to have.

Based on the foregoing 1 and 2, the narrowband terminal device may also be considered as a bandwidth limited (BL) terminal device. It should be noted that the BL terminal device may alternatively have another bandwidth feature in addition to 1 and 2. This is not specifically limited.

3. In embodiments of the present disclosure, it may alternatively be considered that the narrowband terminal device needs to maintain normal data communication with a network device by using a coverage enhancement (CE) technology, and the wideband terminal device may maintain normal data communication with the network device even if the wideband terminal device does not use the CE technology. The CE technology includes but is not limited to a technology such as repeated data transmission or power boost. Alternatively, if both the wideband terminal device and the narrowband terminal device need to maintain normal data communication with the network device through repeated data transmission in some scenarios, a maximum quantity of repetition times needed by the narrowband terminal device to maintain data communication with the network device is less than a maximum quantity of repetition times needed by the wideband terminal device to maintain data communication with the network device.

4. In embodiments of the present disclosure, the narrowband terminal device may alternatively be considered as a low power wide area (LPWA) access terminal device, and the wideband terminal device may be considered as an eMBB terminal device or an ultra-reliable low-latency communication (URLLC) terminal device.

In this embodiment, the access network device 21 may be a chip configured to communicate with the terminal device 20, or may be a device including the chip configured to communicate with the terminal device 20. The access network device 21 is an entity that is on a network side and that is configured to send a signal, receive a signal, or send and receive a signal. It may be understood that when the access network device 21 is the chip, the chip may include a processor and an interface. When the access network device 21 is the device including the chip, the access network device 21 may be an apparatus that is deployed in a radio access network (RAN) and that provides a wireless communication function for the terminal device 20, for example, may be a transmission reception point (TRP), a base station, or a control node in various forms. The control node in various forms is, for example, a network controller, a radio controller, or a radio controller in a cloud radio access network (C-RAN) scenario. Specifically, the access network device may be a macro base station, a micro base station (which is also referred to as a small cell), a relay station, an access point (AP), or the like in various forms, or may be an antenna panel of a base station. The control node may be connected to a plurality of base stations, and configure resources for a plurality of terminals covered by the plurality of base stations. In systems using different radio access technologies, names of devices having functions of a base station may vary. For example, the base station may be an evolved NodeB (evolved NodeB, eNB or eNodeB) in an LTE system, or may be the radio controller in a cloud radio access network (C-RAN) scenario, or may be a (new Generation NodeB, gNB) in 5G. Alternatively, the access network device 21 may be a relay station, an access point, a vehicle-mounted device, a wearable device, a network-side device in a network that is after 5G, or a network device in a future evolved PLMN network. A specific name of the base station is not limited in the present disclosure.

The following specifically describes the communication method provided in embodiments of the present disclosure with reference to FIG. 2.

It should be noted that embodiments of the present disclosure are not limited to the communication system shown in FIG. 2, and may be alternatively applied to another future communication system, for example, a 6G network architecture. In addition, in a future communication system, a function of each device used in embodiments of the present disclosure may remain unchanged, but a name of each device may change.

Figure 3:
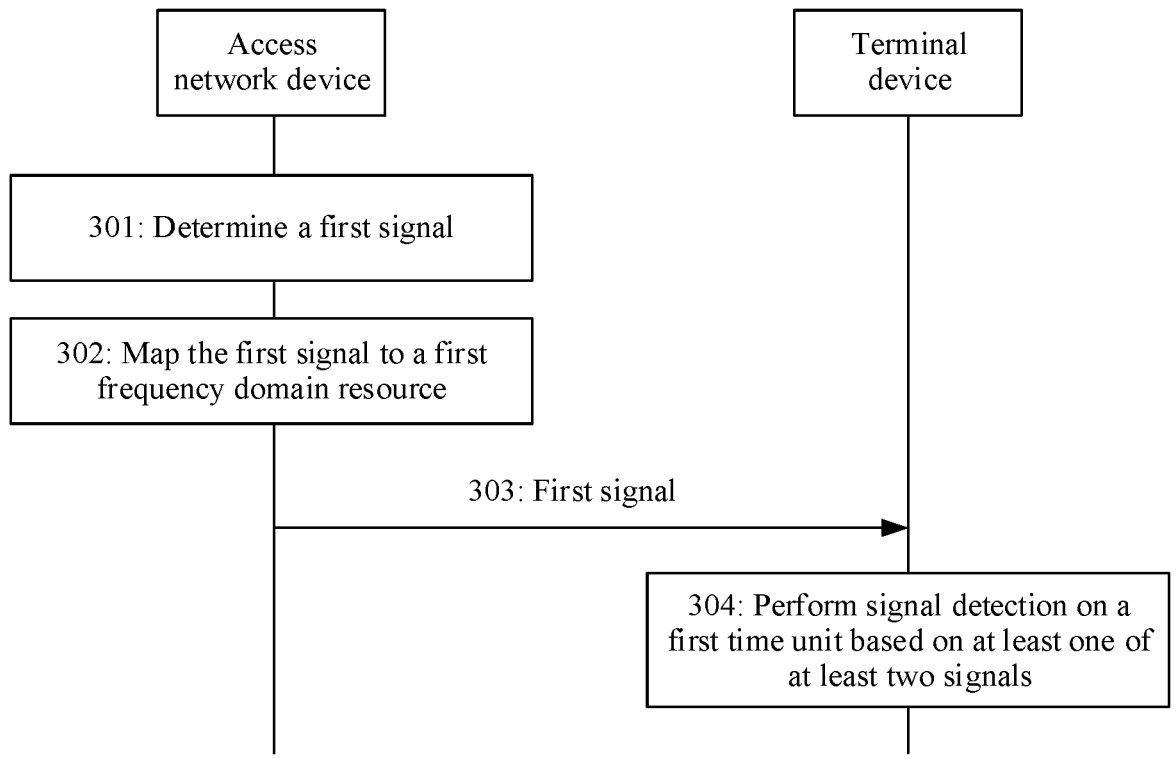
FIG. 3 is a schematic flowchart of a communication method according to an embodiment of the present disclosure.

Further, FIG. 3 is a schematic flowchart of a communication method according to an embodiment of the present disclosure. A terminal device in FIG. 3 may be the terminal device 20 in FIG. 2, and an access network device in FIG. 3 may be the access network device 21 in FIG. 2.

As shown in FIG. 3, the method includes the following steps.

301: The access network device determines a first signal.

The first signal includes at least two signals, and the at least two signals in the first signal include a second signal and a third signal.

Optionally, the first signal is a primary synchronization signal (PSS) or a secondary synchronization signal (secondary synchronization signal, SSS). Further, each of the at least two signals in the first signal is a PSS or an SSS. The second signal and the third signal are PSSs or SSSs.

Optionally, the first signal is a PSS or an SSS, each of the at least two signals in the first signal is a sub-PSS or a sub-SSS, and the second signal and the third signal are sub-PSSs or sub-SSSs. If the first signal is a PSS, each of the at least two signals in the first signal is a sub-PSS, and the second signal and the third signal are sub-PSSs. If the first signal is an SSS, each of the at least two signals in the first signal is a sub-SSS, and the second signal and the third signal are sub-SSSs.

Optionally, that the access network device determines a first signal includes: The access network device determines the second signal and the third signal based on a first sequence.

Optionally, the access network device may determine, based on the first sequence, another signal in the first signal other than the second signal and the third signal. This is not limited herein. In addition, for a manner of determining, based on the first sequence, the another signal in the first signal other than the second signal and the third signal, refer to a manner of determining the second signal and the third signal. Details are not described herein again.

The first sequence is an m-sequence, a ZC sequence (Zadoff-Chu sequence), a gold sequence, or another sequence. This is not limited herein. The m-sequence is short for a longest linear shift register sequence.

Optionally, the first sequence is a sequence for generating a sub-PSS or a sub-SSS.

Optionally, that the access network device determines the second signal and the third signal based on a first sequence includes: The access network device determines the second signal and the third signal by using an m-sequence modulated by using binary phase shift keying (BPSK). Further, if the second signal and the third signal are PSSs, a sequence corresponding to the second signal and the third signal may be $d_k(n)$, where $$d_k(n)=1-2x(m)$$

where $0 \leq n < 30$ (a length of the m-sequence);
$x(i+5)=(x(i+2)+x(i)) \bmod 2$ (a polynomial), and $0 \leq i < 30$;
$[x(5)\ x(4)\ x(3)\ x(2)\ x(1)\ x(0)]=[0\ 0\ 0\ 0\ 0\ 1]$ (an initial sequence);
$m=(n+15k) \bmod 31$, $k=0,1$ (a cyclic shift); and
m is the m-sequence.

Optionally, the second signal and the third signal are determined based on a same sequence generator, lengths of sequences corresponding to the second signal and the third signal are the same, and the second signal and the third signal are the same. It may be understood that other signals in the first signal other than the second signal and the third signal may be determined based on a same sequence generator or different sequence generators. The other signals in the first signal other than the second signal and the third signal may be completely same signals, may be partially same signals, or may be completely different signals. This is not limited herein.

If the first sequence is an m-sequence, for a same sequence generator, there are a same cyclic shift and a same polynomial. In other words, there is a same length of the m-sequence. For different sequence generators, there are different cyclic shifts or different polynomials, in other words, there are different lengths of the m-sequence.

For example, the second signal and the third signal are determined according to m=(n)mod 31 and x(5)=(x(2)+x(0)) mod 2; or the second signal and the third signal are determined according to m=(n+15)mod 31 and x(5)=(x(2)+x(0)) mod 2; or the second signal and the third signal are determined according to m=(n)mod 31 and x(6)=(x(3)+x(1)) mod 2.

Optionally, the second signal and the third signal are determined based on different sequence generators, lengths of sequences corresponding to the second signal and the third signal are different, and the second signal and the third signal are different.

For example, the second signal is determined based on m=(n)mod 31 and x(5)=(x(2)+x(0))mod 2; and the third signal is determined based on m=(n+15)mod 31 and x(5)=(x(2)+x(0))mod 2. Alternatively, the second signal is determined based on m=(n)mod 31 and x(5)=(x(2)+x(0))mod 2; and the third signal is determined based on m=(n)mod 31 and x(6)=(x(3)+x(1))mod 2.

Optionally, that the access network device determines the second signal and the third signal based on a first sequence includes: The access network device determines the second signal and the third signal based on a ZC sequence. Further, if the second signal and the third signal are PSSs, a sequence corresponding to the second signal and the third signal may be $d_k(n)$, where $$d_k(n) = e^{-j\frac{\pi un(n+1)}{31}}, n = 0, 1, \ldots, 30;$$

and u is a root factor.

Optionally, if the first sequence is a ZC sequence, for a same sequence generator, there are a same root factor and a same cyclic shift. Optionally, the root factor may be 13.

Optionally, if the first sequence is a ZC sequence, for different sequence generators, there are different root factors or different cyclic shifts.

For example, if a sequence corresponding to the second signal is $d_0(n)$, k=0, u=11; or k=1, u=17. Alternatively, if the sequence corresponding to the second signal is $d_1(n)$, k=1, u=11; or k=0, u=17. This is not limited herein.

Optionally, that the access network device determines the second signal and the third signal based on a first sequence includes: The access network device determines the second signal and the third signal by using a gold sequence modulated by using BPSK or quadrature phase shift keying (QPSK).

Optionally, if the first sequence is a gold sequence, for a same sequence generator, there are a same initialization seed and a same polynomial.

Optionally, if the first sequence is a gold sequence, for different sequence generators, there are different initialization seeds or different polynomials.

Optionally, that the access network device determines the second signal and the third signal based on a first sequence further includes: The access network device determines the second signal based on first information and a second sequence, and determines the third signal based on the first information and a third sequence. The first information includes at least one of the following: a cell identifier, an index of a synchronization signal block, a half frame number, a frame number, a resource block in which the synchronization signal block is located, or a common resource block (CRB) in which the synchronization signal block is located.

The second sequence and the third sequence are different sequences in the first sequence. For example, the second sequence is an m-sequence, and the third sequence is a ZC sequence; or the second sequence is a ZC sequence, and the third sequence is a ZC sequence. This is not limited herein.

302: The access network device maps the first signal to a first frequency domain resource.

The second signal is mapped to a second frequency domain resource, the third signal is mapped to a third frequency domain resource, and the second frequency domain resource and the third frequency domain resource are located in the first frequency domain resource.

Optionally, the first frequency domain resource includes at least two RBs.

The second frequency domain resource and the third frequency domain resource each include at least one RB. For example, the first frequency domain resource includes six RBs, the second frequency domain resource includes three RBs, and the third frequency domain resource includes three RBs.

Optionally, the second signal and the third signal do not overlap on a frequency domain resource. Other signals in the first signal other than the second signal and the third signal do not overlap on a frequency domain resource.

1. Optionally, the second signal and the third signal are scrambled signals, and the second signal and the third signal correspond to different scrambling codes.

The scrambling code is a random number. This is not limited herein.

For example, the scrambling code corresponding to the second signal is $\mu_1$, the second signal is $d_2(n)=d_2(n)+\mu_1$, the scrambling code corresponding to the third signal is $\mu_2$, and the third signal is $d_3(n)=d_3(n)+\mu_2$. $\mu_1$ and $\mu_2$ are different scrambling codes.

It may be understood that if the access network device scrambles another signal in the first signal other than the second signal and the third signal, refer to 1. For example, other signals in the first signal other than the second signal and the third signal are scrambled signals, and the other signals in the first signal other than the second signal and the third signal correspond to completely different scrambling codes.

It can be learned that, in the foregoing technical solution, a signal is scrambled, so that a narrowband terminal device can successfully detect, on a time unit based on at least one signal in the first signal and at least one signal in the fourth signal, a signal that needs to be accessed. In addition, because the narrowband terminal device may perform signal detection based on a sub-signal in the first signal, and the sub-signal occupies fewer resource blocks, energy consumption for the narrowband terminal device to detect a synchronization signal is reduced.

2. Optionally, that the access network device maps the first signal to a first frequency domain resource includes: The access network device maps the second signal to the second frequency domain resource in a first mapping manner, and maps the third signal to the third frequency domain resource in a second mapping manner, where the first mapping manner is different from the second mapping manner.

If the first mapping manner is in a positive sequence, the second mapping manner is in an inverted sequence. If the first mapping manner is in an inverted sequence, the second mapping manner is in a positive sequence.

Figure 4:
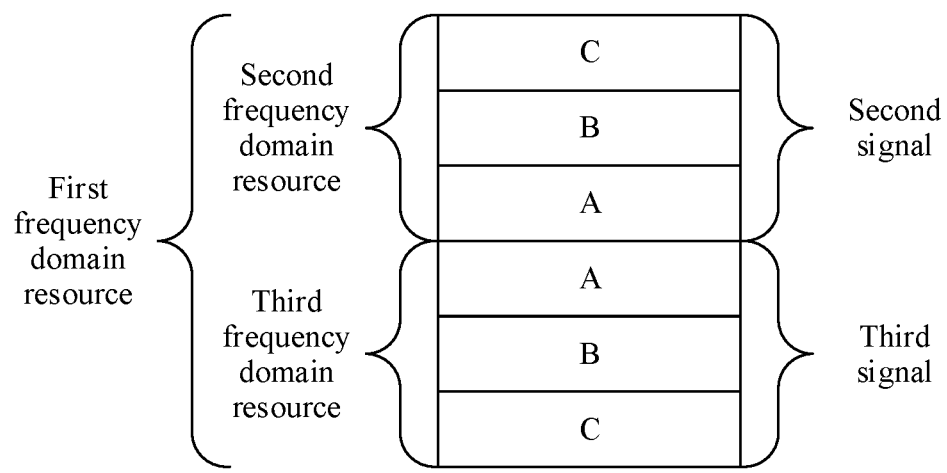
FIG. 4 is a schematic diagram of a mapping manner according to an embodiment of the present disclosure.

For example, FIG. 4 is a schematic diagram of a mapping manner according to an embodiment of the present disclosure. As shown in FIG. 4, the sequence corresponding to the second signal and the sequence corresponding to the third signal are $x_0$-$x_{35}$. With reference to FIG. 4, it can be learned that the second frequency domain resource and the third frequency domain resource are adjacent frequency domain resources in the first frequency domain resource. A mapping manner corresponding to the second signal before scrambling is an inverted-sequence mapping manner (C, B, A); and a mapping manner corresponding to the third signal before scrambling is a positive-sequence mapping manner (A, B, C).

In addition, for a specific mapping manner of another signal in the first signal other than the second signal and the third signal, refer to 2. This is not limited herein.

It can be learned that, in the foregoing technical solution, a signal is mapped to a corresponding frequency domain resource in a corresponding mapping manner, so that a narrowband terminal device can successfully detect, on a time unit based on at least one signal in the first signal and at least one signal in the fourth signal, a signal that needs to be accessed. In addition, because the narrowband terminal device may perform signal detection based on a sub-signal in the first signal, and the sub-signal occupies fewer resource blocks, energy consumption for the narrowband terminal device to detect a synchronization signal is reduced.

3. Optionally, a frequency spacing between the second frequency domain resource and the third frequency domain resource is a specified value, or is determined based on a frequency band in which the first signal is located.

Figure 5:
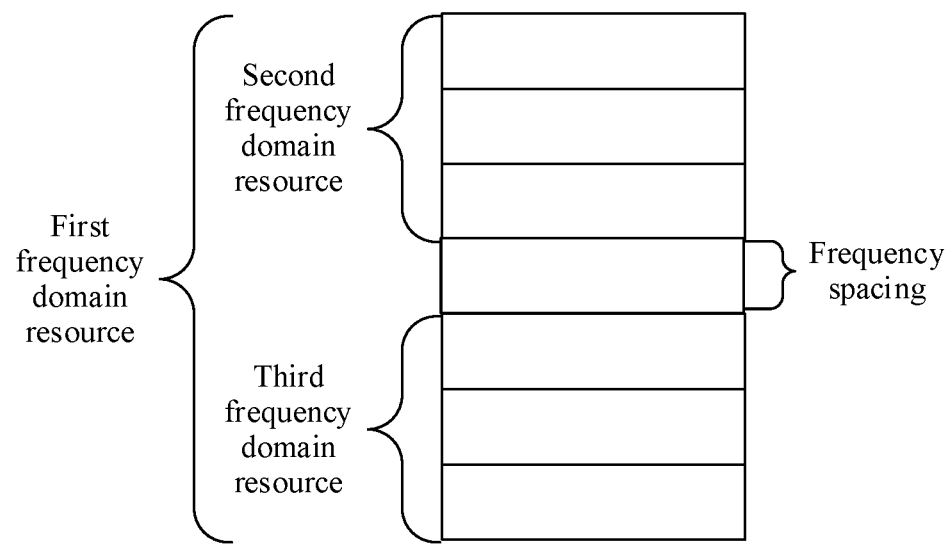
FIG. 5 is a schematic diagram in which a frequency spacing exists between a second frequency domain resource and a third frequency domain resource according to an embodiment of the present disclosure.

For example, FIG. 5 is a schematic diagram in which a frequency spacing exists between a second frequency domain resource and a third frequency domain resource according to an embodiment of the present disclosure. As shown in FIG. 5, it can be learned that the first frequency domain resource includes the second frequency domain resource and the third frequency domain resource, and the first frequency domain resource further includes a frequency spacing. Further, there is the frequency spacing between the second frequency domain resource and the third frequency domain resource.

Optionally, the specified value is a maximum frequency domain interval corresponding to the frequency band in which the first signal is located.

For example, Table 1 shows frequency spacings corresponding to frequency bands in 5G. For a frequency band n1, a subcarrier spacing (SCS) of a corresponding SS block (which is also referred to as an SSB) is 15 kilohertz kHz, a corresponding SS block pattern 1 is a case A, and a corresponding frequency spacing is 1200 kHz. For a frequency band n2, a subcarrier spacing (SCS) of a corresponding SS block (which is also referred to as an SSB) is 15 kilohertz kHz, a corresponding SS block pattern 1 is a case A, and a corresponding frequency spacing is 1200 kHz. For a frequency band n3, a subcarrier spacing (SCS) of a corresponding SS block (which is also referred to as an SSB) is 15 kilohertz kHz, a corresponding SS block pattern 1 is a case A, and a corresponding frequency spacing is 1500 kHz.

TABLE 1

Frequency spacings corresponding to frequency bands in 5 G

| NR operating band | SS Block SCS | SS Block pattern 1 | Frequency spacing |
|---|---|---|---|
| n1 | 15 kHz | Case A | 1200 kHz |
| n2 | 15 kHz | Case A | 1200 kHz |
| n3 | 15 kHz | Case A | 1500 kHz |
| ... | ... | ... | ... |

With reference to Table 1, for example, if the frequency band in which the first signal is located is 15 megahertz, because the frequency band n1, the frequency band n2, and the frequency band n3 all support a frequency band of 15 megahertz, and the frequency spacing corresponding to the frequency band n3 is a largest frequency spacing in the frequency spacings corresponding to the frequency band n1, the frequency band n2, and the frequency band n3, the specified value is 1500 kHz.

With reference to Table 1, for example, if the frequency band in which the first signal is located is 15 megahertz, and the frequency spacing between the second frequency domain resource and the third frequency domain resource is determined based on the frequency band in which the first signal is located, the frequency spacing between the second frequency domain resource and the third frequency domain resource is 1200 kHz or 1500 kHz. Because the frequency band n1, the frequency band n2, and the frequency band n3 all support a frequency band of 15 megahertz, when the frequency spacing between the second frequency domain resource and the third frequency domain resource is determined based on the frequency band in which the first signal is located, 1200 kHz may be used as the frequency spacing between the second frequency domain resource and the third frequency domain resource, or a maximum frequency spacing 1500 kHz corresponding to the frequency band in which the first signal is located may be used as the frequency spacing between the second frequency domain resource and the third frequency domain resource. This is not limited herein.

In addition, for a frequency spacing between adjacent frequency domain resources corresponding to another signal in the first signal other than the second signal and the third signal, refer to the frequency spacing between the second frequency domain resource and the third frequency domain resource. This is not limited herein.

It can be learned that, in the foregoing technical solution, a frequency spacing is set between adjacent frequency domain, to prevent a narrowband terminal device from incorrectly detecting an adjacent sub-signal when performing signal detection, so that the narrowband terminal device can successfully detect a signal that needs to be accessed. In addition, because the narrowband terminal device may perform signal detection based on a sub-signal in the first signal, and the sub-signal occupies fewer resource blocks, energy consumption for the narrowband terminal device to detect a synchronization signal is reduced.

Optionally, for the second signal, the third signal, and another signal in the first signal other than the second signal and the third signal, the access network device may perform 1, 2, or 3, or perform at least one of 1, 2, and 3 on the second signal, the third signal, and the another signal. This is not limited herein.

Optionally, if the second signal and the third signal are determined based on a same signal generator, the access network device may perform at least one of 1, 2, and 3 on the second signal and the third signal. If the second signal and the third signal are determined based on different signal generators, the access network device may not perform at least one of 1, 2, and 3 on the second signal and the third signal, or perform at least one of 1, 2, and 3 on the second signal and the third signal. This is not limited herein.

303: The access network device sends the first signal on the first frequency domain resource and a first time unit. Correspondingly, the terminal device may receive the first signal on the first frequency domain resource and the first time unit.

Optionally, the first time unit is a slot, a subframe, or the like. This is not limited herein.

304: The terminal device performs signal detection on the first time unit based on at least one of the at least two signals.

Optionally, that the terminal device performs signal detection on the first time unit based on at least one of the at least two signals includes: The terminal device performs signal detection on the first time unit based on at least one of the at least two signals in the first signal.

Optionally, in the present disclosure, a terminal device supporting wideband access may perform signal detection on the first time unit based on the first signal and a fourth signal. If the first signal is detected based on the fourth signal, the terminal device supporting wideband access may perform access based on the first signal. A terminal device supporting narrowband access may perform detection on the first time unit based on one sub-signal in the fourth signal and one sub-signal in the first signal. If one sub-signal in the first signal is detected based on one sub-signal in the fourth signal, the terminal device supporting narrowband access may perform access based on the detected sub-signal. For example, the second signal in the first signal is detected based on a fifth signal in the fourth signal, the terminal device supporting narrowband access may perform access based on the detected second signal.

It can be learned that, in the foregoing technical solution, a terminal device performs signal detection on a time unit based on a synchronization signal obtained from an access network device and a locally generated synchronization signal. The terminal device may perform signal detection on the time unit based on at least one of the at least two signals. To be specific, a wideband terminal device may perform signal detection based on the first signal, and a narrowband terminal device may perform signal detection based on a sub-signal in the first signal. Therefore, access requirements of the wideband terminal device and the narrowband terminal device are compatible. In addition, because the narrowband terminal device may perform signal detection based on the sub-signal in the first signal, and the sub-signal occupies fewer resource blocks, energy consumption for the narrowband terminal device to detect a synchronization signal is reduced.

Optionally, that the terminal device performs signal detection on the first time unit based on at least one of the at least two signals includes: The terminal device generates a fourth signal, where if the first signal is a primary synchronization signal, the fourth signal is a primary synchronization signal; or if the first signal is a secondary synchronization signal, the fourth signal is a secondary synchronization signal, where the fourth signal includes at least two signals, and the at least two signals include a fifth signal and a sixth signal; maps the fourth signal to a fourth frequency domain resource, where the fifth signal is mapped to a fifth frequency domain resource, the sixth signal is mapped to a sixth frequency domain resource, and the fifth frequency domain resource and the sixth frequency domain resource are located in the fourth frequency domain resource; and performs signal detection on the first time unit based on at least one signal in the first signal and at least one signal in the fourth signal.

If the fourth signal is a primary synchronization signal, the at least two signals in the fourth signal are primary synchronization signals, and the fifth signal and the sixth signal are also primary synchronization signals. If the fourth signal is a secondary synchronization signal, the at least two signals in the fourth signal are secondary synchronization signals, and the fifth signal and the sixth signal are also secondary synchronization signals.

Optionally, if the fourth signal is a PSS, each of the at least two signals in the fourth signal is a sub-PSS, and the fifth signal and the sixth signal are sub-PSSs. If the fourth signal is an SSS, each of the at least two signals in the fourth signal is a sub-SSS, and the fifth signal and the sixth signal are sub-SSSs.

It can be learned that, in the foregoing technical solution, a terminal device locally generates a synchronization signal, so that the terminal device may perform signal detection on a time unit based on a synchronization signal obtained from an access network device and the locally generated synchronization signal. The terminal device may perform signal detection on the time unit based on at least one signal in the first signal and at least one signal in the fourth signal. To be specific, a wideband terminal device may perform signal detection based on the first signal, and a narrowband terminal device may perform signal detection based on a sub-signal in the first signal. Therefore, access requirements of the wideband terminal device and the narrowband terminal device are compatible. In addition, because the narrowband terminal device may perform signal detection based on the sub-signal in the first signal, and the sub-signal occupies fewer resource blocks, energy consumption for the narrowband terminal device to detect a synchronization signal is reduced.

Optionally, that the terminal device generates a fourth signal includes: The terminal device determines the fifth signal and the sixth signal based on a fourth sequence.

Optionally, the terminal device may determine, based on the fourth sequence, another signal in the fourth signal other than the fifth signal and the sixth signal. This is not limited herein. In addition, for a manner of determining, based on the fourth sequence, the another signal in the fourth signal other than the fifth signal and the sixth signal, refer to a manner of determining the fifth signal and the sixth signal. Details are not described herein again.

The fourth sequence is an m-sequence, a ZC sequence (Zadoff-Chu sequence), a gold sequence, or another sequence. This is not limited herein.

Optionally, the fourth sequence is a sequence for generating a sub-PSS or a sub-SSS.

Optionally, that the terminal device determines the fifth signal and the sixth signal based on a fourth sequence includes: The terminal device determines the fifth signal and the sixth signal by using an m-sequence modulated by using binary phase shift keying (BPSK). Further, if the fifth signal and the sixth signal are PSSs, a sequence corresponding to the fifth signal and the sixth signal may be $d_p(n)$, where $$d_p(n)=1-2x(m)$$

where $0 \le n < 30$ (a length of the m-sequence);
$x(i+5)=(x(i+2)+x(i)) \bmod 2$ (a polynomial), and $0 \le i < 30$;
$[x(5)\ x(4)\ x(3)\ x(2)\ x(1)\ x(0)]=[0\ 0\ 0\ 0\ 0\ 1]$ (an initial sequence);
$m=(n+15p) \bmod 31$, $p=0,1$ (a cyclic shift); and
m is the m-sequence.

Optionally, the fifth signal and the sixth signal are determined based on a same sequence generator, lengths of sequences corresponding to the fifth signal and the sixth signal are the same, and the fifth signal and the sixth signal are the same. It may be understood that other signals in the fourth signal other than the fifth signal and the sixth signal may be determined based on a same sequence generator or different sequence generators. The other signals in the fourth signal other than the fifth signal and the sixth signal may be completely same signals, may be partially same signals, or may be completely different signals. This is not limited herein.

If the first sequence is an m-sequence, for a same sequence generator, there are a same cyclic shift and a same polynomial. In other words, there is a same length of the m-sequence. For different sequence generators, there are different cyclic shifts or different polynomials. In other words, there are different lengths of the m-sequence.

For example, the fifth signal and the sixth signal are determined according to m=(n)mod 31 and x(5)=(x(2)+x(0))mod 2; or the fifth signal and the sixth signal are determined according to m=(n+15)mod 31 and x(5)=(x(2)+x(0))mod 2; or the fifth signal and the sixth signal are determined according to m=(n)mod 31 and x(6)=(x(3)+x(1))mod 2.

Optionally, the fifth signal and the sixth signal are determined based on different sequence generators, lengths of sequences corresponding to the fifth signal and the sixth signal are different, and the fifth signal and the sixth signal are different.

For example, the fifth signal is determined based on m=(n)mod 31 and x(5)=(x(2)+x(0))mod 2; and the sixth signal is determined based on m=(n+15)mod 31 and x(5)=(x(2)+x(0))mod 2. Alternatively, the fifth signal is determined based on m=(n)mod 31 and x(5)=(x(2)+x(0))mod 2; and the sixth signal is determined based on m=(n)mod 31 and x(6)=(x(3)+x(1))mod 2.

Optionally, that the terminal device determines the fifth signal and the sixth signal based on a fourth sequence includes: The terminal device determines the fifth signal and the sixth signal based on a ZC sequence. Further, if the fifth signal and the sixth signal are PSSs, a sequence corresponding to the fifth signal and the sixth signal may be $d_p(n)$, where $$d_p(n) = e^{-j\frac{\pi u n(n+1)}{31}}, n = 0, 1, \ldots, 30;$$

and $$d_p(n) = e^{-j\frac{\pi u n(n+1)}{31}}, n = 0, 1, \ldots, 30$$

is a root factor.

Optionally, if the fourth sequence is a ZC sequence, for a same sequence generator, there are a same root factor and a same cyclic shift. Optionally, the root factor may be 13.

Optionally, if the fourth sequence is a ZC sequence, for different sequence generators, there are different root factors or different cyclic shifts.

For example, if a sequence corresponding to the fifth signal is p=0, u=11, p=0, u=11; or p=1, u=17. Alternatively, if the sequence corresponding to the fifth signal is $d_1(n)$, p=1, u=11; or p=0, u=17. This is not limited herein.

Optionally, that the terminal device determines the fifth signal and the sixth signal based on a fourth sequence includes: The terminal device determines the fifth signal and the sixth signal by using a gold sequence modulated by using BPSK or quadrature phase shift keying (QPSK).

Optionally, if the fourth sequence is a gold sequence, for a same sequence generator, there are a same initialization seed and a same polynomial.

Optionally, if the fourth sequence is a gold sequence, for different sequence generators, there are different initialization seeds or different polynomials.

Optionally, that the terminal device determines the fifth signal and the sixth signal based on a fourth sequence further includes: The terminal device determines the fifth signal based on first information and a fifth sequence, and determines the sixth signal based on the first information and a sixth sequence. The first information includes at least one of the following: a cell identifier, an index of a synchronization signal block, a half frame number, a frame number, a resource block in which the synchronization signal block is located, and a common resource block (CRB) in which the synchronization signal block is located.

The fifth sequence and the sixth sequence are different sequences in the first sequence. For example, the fifth sequence is an m-sequence, and the sixth sequence is a ZC sequence; or the fifth sequence is a ZC sequence, and the sixth sequence is a ZC sequence. This is not limited herein.

Optionally, the fourth frequency domain resource includes at least two RBs.

The fifth frequency domain resource and the sixth frequency domain resource include at least one RB each. For example, the fourth frequency domain resource includes six RBs, the fifth frequency domain resource includes three RBs, and the sixth frequency domain resource includes three RBs.

Optionally, the fifth signal and the sixth signal do not overlap on a frequency domain resource. Other signals in the fourth signal other than the fifth signal and the sixth signal do not overlap on a frequency domain resource.

4. Optionally, the fifth signal and the sixth signal are scrambled signals, and the fifth signal and the sixth signal correspond to different scrambling codes.

The scrambling code is a random number. This is not limited herein.

For example, the scrambling code corresponding to the fifth signal is $\delta_1$, the fifth signal is $d_2(n)=d_2(n)+\delta_1$, the scrambling code corresponding to the sixth signal is $\delta_2$, and the sixth signal is $d_3(n)=d_3(n)+\delta2$. $\delta1$ and $\delta2$ are different scrambling codes.

It may be understood that if the access network device scrambles another signal in the fourth signal other than the fifth signal and the sixth signal, refer to 4. For example, other signals in the fourth signal other than the fifth signal and the sixth signal are scrambled signals, and the other signals in the fourth signal other than the fifth signal and the sixth signal correspond to completely different scrambling codes.

It can be learned that, in the foregoing technical solution, a locally generated signal is scrambled, so that a narrowband terminal device can successfully detect, on a time unit based on at least one signal in the first signal and at least one signal in the fourth signal, a signal that needs to be accessed. In addition, because the narrowband terminal device may perform signal detection based on a sub-signal in the first signal, and the sub-signal occupies fewer resource blocks, energy consumption for the narrowband terminal device to detect a synchronization signal is reduced.

5. Optionally, that the terminal device maps the fourth signal to the fourth frequency domain resource includes: The terminal device maps the fifth signal to the fifth frequency domain resource in a third mapping manner, and maps the sixth signal to the sixth frequency domain resource in a fourth mapping manner, where the third mapping manner is different from the fourth mapping manner.

If the third mapping manner is in a positive sequence, the fourth mapping manner is in an inverted sequence. If the third mapping manner is in an inverted sequence, the fourth mapping manner is in a positive sequence.

In addition, for a specific mapping manner of another signal in the fourth signal other than the fifth signal and the sixth signal, refer to 5. This is not limited herein.

It can be learned that, in the foregoing technical solution, for a locally generated signal, the signal is mapped to a corresponding frequency domain resource in a corresponding mapping manner, so that a narrowband terminal device can successfully detect, on a time unit based on at least one signal in the first signal and at least one signal in the fourth signal, a signal that needs to be accessed. In addition, because the narrowband terminal device may perform signal detection based on a sub-signal in the first signal, and the sub-signal occupies fewer resource blocks, energy consumption for the narrowband terminal device to detect a synchronization signal is reduced.

6. Optionally, a frequency spacing between the fifth frequency domain resource and the sixth frequency domain resource is a specified value, or is determined based on a frequency band in which the fourth signal is located.

Optionally, the specified value is a maximum frequency domain interval corresponding to the frequency band in which the fourth signal is located.

With reference to Table 1, for example, if the frequency band in which the fourth signal is located is 15 megahertz, because the frequency band n1, the frequency band n2, and the frequency band n3 all support a frequency band of 15 megahertz, and the frequency spacing corresponding to the frequency band n3 is a largest frequency spacing in the frequency spacings corresponding to the frequency band n1, the frequency band n2, and the frequency band n3, the specified value is 1500 kHz.

With reference to Table 1, for example, if the frequency band in which the fourth signal is located is 15 megahertz, and the frequency spacing between the fifth frequency domain resource and the sixth frequency domain resource is determined based on the frequency band in which the fourth signal is located, the frequency spacing between the fifth frequency domain resource and the sixth frequency domain resource is 1200 kHz or 1500 kHz. Because the frequency band n1, the frequency band n2, and the frequency band n3 all support a frequency band of 15 megahertz, when the frequency spacing between the fifth frequency domain resource and the sixth frequency domain resource is determined based on the frequency band in which the fourth signal is located, 1200 kHz may be used as the frequency spacing between the fifth frequency domain resource and the sixth frequency domain resource, or a maximum frequency spacing 1500 kHz corresponding to the frequency band in which the fourth signal is located may be used as the frequency spacing between the fifth frequency domain resource and the sixth frequency domain resource. This is not limited herein.

In addition, for a frequency spacing between adjacent frequency domain resources corresponding to another signal in the fourth signal other than the fifth signal and the sixth signal, refer to the frequency spacing between the fifth frequency domain resource and the sixth frequency domain resource. This is not limited herein.

It can be learned that, in the foregoing technical solution, a frequency spacing is set between adjacent frequency domain, to prevent a narrowband terminal device from incorrectly detecting an adjacent sub-signal when performing signal detection, so that the narrowband terminal device can successfully detect, on a time unit based on at least one signal in the first signal and at least one signal in the fourth signal, a signal that needs to be accessed. In addition, because the narrowband terminal device may perform signal detection based on a sub-signal in the first signal, and the sub-signal occupies fewer resource blocks, energy consumption for the narrowband terminal device to detect a synchronization signal is reduced.

Optionally, for the fifth signal, the sixth signal, and another signal in the fourth signal other than the fifth signal and the sixth signal, the terminal device may perform 4, 5, or 6, or perform at least one of 4, 5, and 6 on the fifth signal, the sixth signal, and the another signal. This is not limited herein.

Optionally, if the fifth signal and the sixth signal are determined based on a same signal generator, the access network device may perform at least one of 4, 5, and 6 on the fifth signal and the sixth signal. If the fifth signal and the sixth signal are determined based on different signal generators, the access network device may not perform at least one of 4, 5, and 6 on the fifth signal and the sixth signal, or perform at least one of 4, 5, and 6 on the fifth signal and the sixth signal. This is not limited herein.

Figure 6:
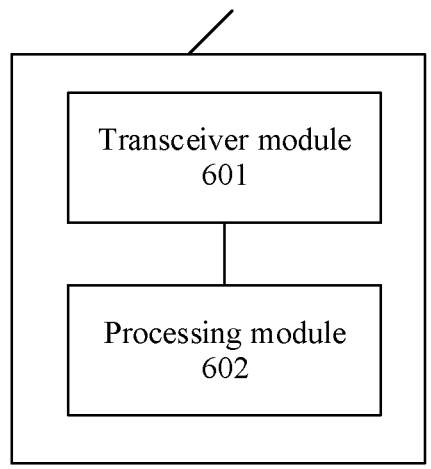
FIG. 6 is a schematic diagram of a structure of a communication apparatus according to an embodiment of the present disclosure.

The following describes a structure of a communication apparatus. Specifically, FIG. 6 is a schematic diagram of a structure of a communication apparatus according to an embodiment of the present disclosure. The communication apparatus 600 may be used in the method shown in FIG. 3, and the communication apparatus 600 is the terminal device 20 in FIG. 2. As shown in FIG. 6, the communications apparatus 600 includes a transceiver module 601 and a processing module 602. The transceiver module 601 performs a receiving and sending operation in the foregoing method, and another operation is performed by the processing module 602. Details are not described herein.

Figure 7:
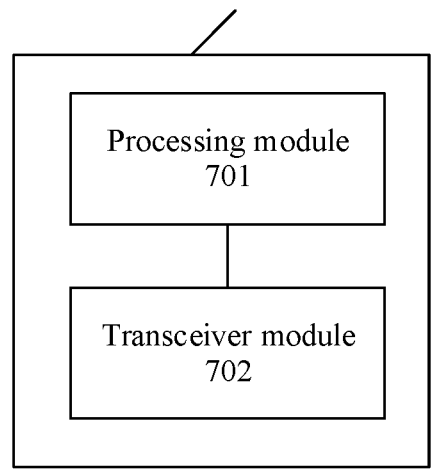
FIG. 7 is a schematic diagram of a structure of another communication apparatus according to an embodiment of the present disclosure.

FIG. 7 is a schematic diagram of a structure of another communication apparatus according to an embodiment of the present disclosure. The communication apparatus 700 may be used in the method shown in FIG. 3, and the communication apparatus is the access network device 21 in FIG. 2. As shown in FIG. 7, the communication apparatus 700 includes a processing module 701 and a transceiver module 702. The transceiver module 702 performs a receiving and sending operation in the foregoing method, and another operation is performed by the processing module 701. Details are not described herein.

In a possible implementation, when the terminal device or the access network device is a chip, the transceiver module 601 or the transceiver module 702 may be an interface, a pin, a circuit, or the like. The interface may be configured to input to-be-processed data to a processor, and may output a processing result of the processor to the outside. During specific implementation, the interface may be a general-purpose input/output (GPIO) interface, and may be connected to a plurality of peripheral devices (for example, a display (LCD), a camera, a radio frequency (RF) module, and an antenna). The interface is connected to the processor through a bus.

The processing module 602 or the processing module 701 may be a processor. The processor may execute computer executable instructions stored in a storage module, so that the chip performs the method in the embodiment in FIG. 3.

Further, the processor may include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor may be an application-specific integrated circuit (ASIC) architecture, a microprocessor without interlocked pipeline stages (MIPS) architecture, an advanced reduced instruction set computing machines (advanced RISC machines, ARM) architecture, a network processor (NP) architecture, or the like. The processor may be a single-core or multi-core processor.

The storage module may be a storage module in the chip, for example, a register or a cache. Alternatively, the storage module may be a storage module located outside the chip, for example, a read-only memory (ROM), another type of static storage device that can store static information and instructions, or a random access memory (RAM).

It should be noted that a function corresponding to each of the processor and the interface may be implemented by using a hardware design, may be implemented by using a software design, or may be implemented by a combination of software and hardware. This is not limited herein.

Figure 8:
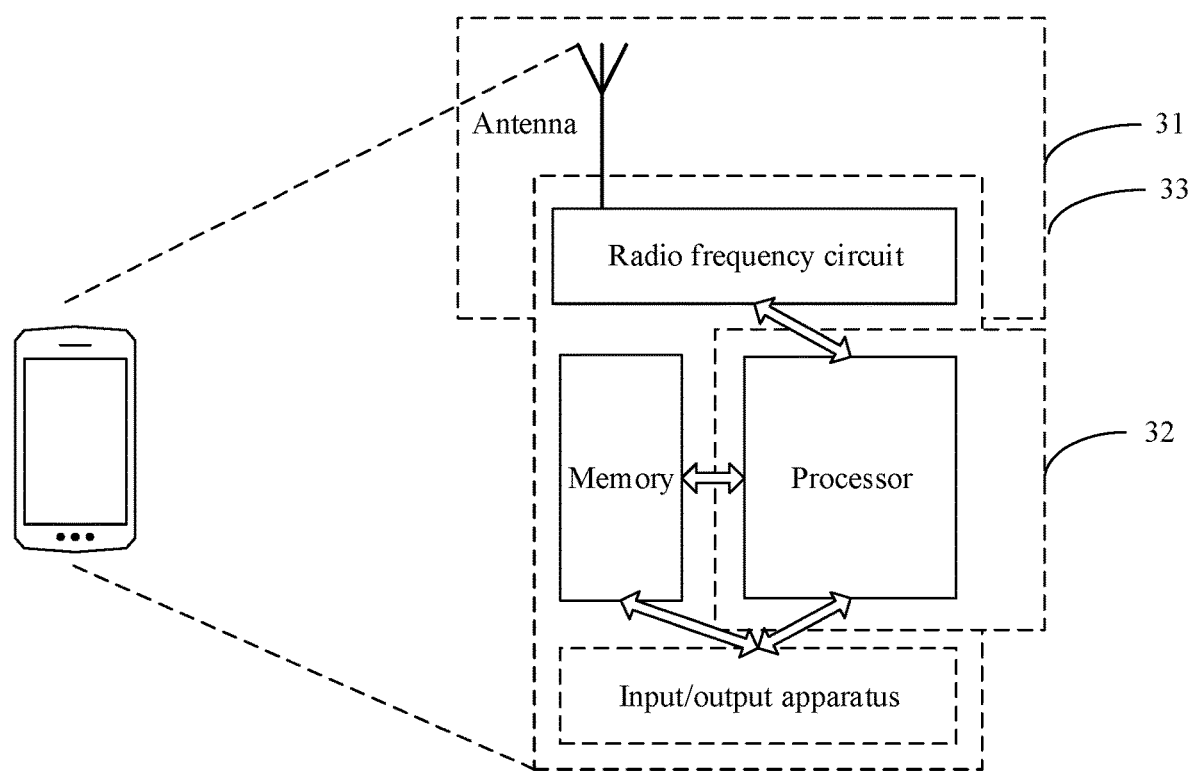
FIG. 8 is a schematic diagram of a structure of a simplified communication apparatus according to an embodiment of the present disclosure.

FIG. 8 is a schematic diagram of a structure of a simplified communication apparatus according to an embodiment of the present disclosure. For ease of understanding and convenience of figure illustration, FIG. 8 shows an example in which the terminal device is a mobile phone. As shown in FIG. 8, the terminal device includes at least one processor, and may further include a radio frequency circuit, an antenna, and an input/output apparatus. The processor may be configured to process a communication protocol and communication data, and may be further configured to control the terminal device, execute a software program, process data of the software program, and the like. The terminal device may further include a memory. The memory is mainly configured to store a software program and data. These related programs may be loaded into the memory when the communication apparatus is delivered from a factory, or may be loaded into the memory when needed later. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, only one memory and one processor are shown in FIG. 8. In an actual terminal device product, there may be one or more processors and one or more memories. The memory may also be referred to as a storage medium, a storage device, or the like. The memory may be disposed independent of the processor, or may be integrated with the processor. This is not limited in embodiments of the present disclosure.

In this embodiment, an antenna having sending and receiving functions and the radio frequency circuit may be considered as a receiving unit and a sending unit (which may also be collectively referred to as a transceiver unit) of the terminal device, and a processor having a processing function may be considered as a processing unit of the terminal device. As shown in FIG. 8, the terminal device includes a receiving module 31, a processing module 32, and a sending module 33. The receiving module 31 may also be referred to as a receiver, a receiver circuit, or the like. The sending module 33 may also be referred to as a transmitter, a transmitter circuit, or the like. The processing module 32 may also be referred to as a processor, a processing board, a processing apparatus, or the like.

For example, the processing module 32 is configured to perform a function of the terminal device in the embodiment shown in FIG. 3.

Figure 9:
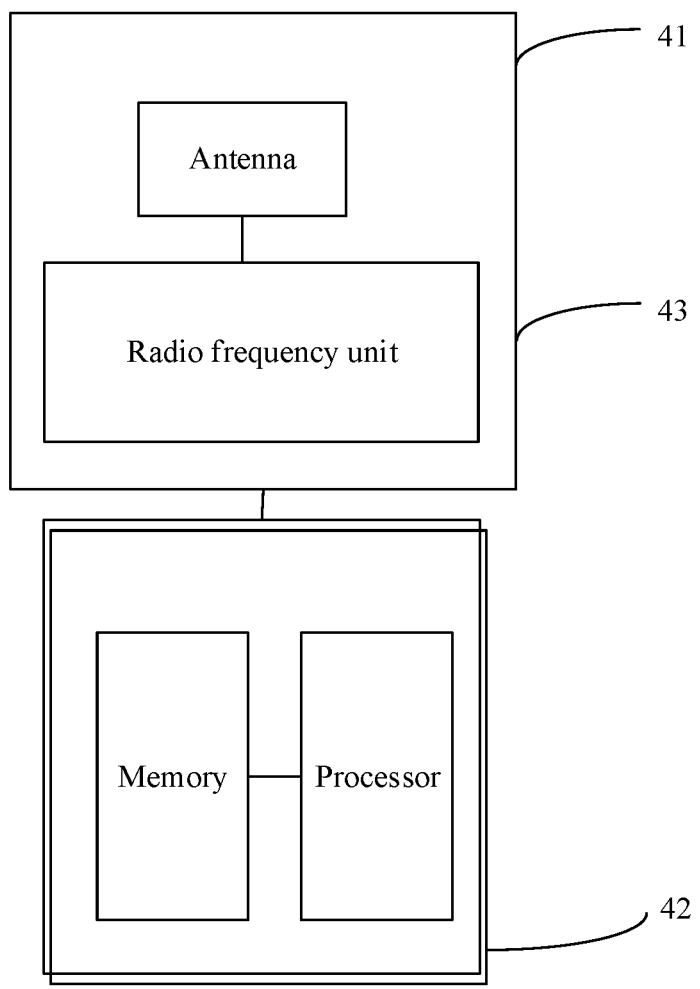
FIG. 9 is a schematic diagram of a structure of a simplified access network device according to an embodiment of the present disclosure.

FIG. 9 is a schematic diagram of a structure of a simplified access network device according to an embodiment of the present disclosure. The access network device includes a part 42 and a part for radio frequency signal sending/receiving and conversion. The part for radio frequency signal sending/receiving and conversion further includes a receiving module 41 and a sending module 43 (which may also be collectively referred to as a transceiver module). The part for radio frequency signal sending/receiving and conversion is mainly configured to send/receive a radio frequency signal and perform conversion between the radio frequency signal and a baseband signal. The part 42 is mainly configured to perform baseband processing, control the access network device, and the like. The receiving module 41 may also be referred to as a receiver, a receiver circuit, or the like. The sending module 43 may also be referred to as a transmitter, a transmitter circuit, or the like. The part 42 is usually a control center of the access network device, may be usually referred to as a processing module, and is configured to control the access network device to perform the steps performed by the access network device in FIG. 3. For details, refer to the foregoing descriptions of the related parts.

The part 42 may include one or more boards. Each board may include one or more processors and one or more memories. The processor is configured to read and execute a program in the memory to implement a baseband processing function and control the access network device. If there are a plurality of boards, the boards may be interconnected to improve a processing capability. In an optional implementation, the plurality of boards may share one or more processors, the plurality of boards may share one or more memories, or the plurality of boards may share one or more processors at the same time.

For example, for the access network device, the sending module 43 is configured to perform a function of the access network device in the embodiment shown in FIG. 3.

The present disclosure further provides a computer-readable storage medium. The computer-readable storage medium stores a computer program. When the computer program is run, the method according to any possible implementation in FIG. 3 is implemented.

In the foregoing specific implementations, the objectives, technical solutions, and beneficial effects of the present disclosure are further described in detail. It should be understood that the foregoing descriptions are merely specific implementations of the present disclosure, but are not intended to limit the protection scope of the present disclosure. Any modification, equivalent replacement, improvement, or the like made based on the technical solutions of the present disclosure shall fall within the protection scope of the present disclosure.

What is claimed is:

1. A communication method, comprising:
receiving a first signal on a first frequency domain resource and a first time unit, wherein the first signal is a primary synchronization signal or a secondary synchronization signal, the first signal comprises at least two signals including a second signal and a third signal, the second signal is mapped to a second frequency domain resource, the third signal is mapped to a third frequency domain resource, and the second frequency domain resource and the third frequency domain resource are located in the first frequency domain resource; and
performing signal detection on the first time unit based on at least one of the at least two signals,
wherein the performing signal detection on the first time unit based on at least one of the at least two signals comprises:
generating a fourth signal, wherein when the first signal is a primary synchronization signal, the fourth signal is a primary synchronization signal; and when the first signal is a secondary synchronization signal, the fourth signal is a secondary synchronization signal, wherein the fourth signal comprises at least two signals including a fifth signal and a sixth signal;
mapping the fourth signal to a fourth frequency domain resource, wherein the fifth signal is mapped to a fifth frequency domain resource, the sixth signal is mapped to a sixth frequency domain resource, and the fifth frequency domain resource and the sixth frequency domain resource are located in the fourth frequency domain resource; and
performing signal detection on the first time unit based on at least one signal in the first signal and at least one sign in the fourth signal,
wherein the mapping the fourth signal to a fourth frequency domain resource comprises:
mapping the fifth signal to the fifth frequency domain resource in resource in a third mapping manner, and
mapping the sixth signal to the sixth frequency domain resource in a fourth mapping manner, wherein the third mapping manner is different from the fourth mapping manner.

2. The method according to claim 1, wherein the fifth signal and the sixth signal are determined based on a same signal generator or different signal generators.

3. The method according to claim 1, wherein the fifth signal and the sixth signal are scrambled signals, and the fifth signal and the sixth signal correspond to different scrambling codes.

4. The method according to claim 1, wherein a frequency spacing between the fifth frequency domain resource and the sixth frequency domain resource is a specified value, or is determined based on a frequency band in which the fourth signal is located.

5. The method according to claim 1, wherein the third mapping manner is different from the fourth mapping manner;
when the third mapping manner is in a positive sequence, the fourth mapping manner is in an inverted sequence; and
when the third mapping manner is in an inverted sequence, the fourth mapping manner is in a positive sequence.

6. A communication method, comprising:
determining a first signal, wherein the first signal is a primary synchronization signal or a secondary synchronization signal, the first signal comprises at least two signals, and the at least two signals comprise a second signal and a third signal;
mapping the first signal to a first frequency domain resource, wherein the second signal is mapped to a second frequency domain resource, the third signal is mapped to a third frequency domain resource, and the second frequency domain resource and the third frequency domain resource are located in the first frequency domain resource; and
sending the first signal on the first frequency domain resource and a first time unit,
wherein the mapping the first signal to a first frequency domain resource comprises:
mapping the second signal to the second frequency domain resource in a first mapping manner, and mapping the third signal to the third frequency domain resource in a second mapping manner, wherein the first mapping manner is different from the second mapping manner;
when the first mapping manner is in a positive sequence, the second mapping manner is in an inverted sequence; and
when the first mapping manner is in an inverted sequence, the second mapping manner is in a positive sequence.

7. The method according to claim 6, wherein the second signal and the third signal are determined based on a same sequence generator or different sequence generators.

8. The method according to claim 6, wherein the second signal and the third signal are scrambled signals, and the second signal and the third signal correspond to different scrambling codes.

9. The method according to claim 6, wherein a frequency spacing between the second frequency domain resource and the third frequency domain resource is a specified value, or is determined based on a frequency band in which the first signal is located.

10. A communication apparatus, comprising:
at least one processor; and
at least one storage medium coupled to the at least one processor and storing instructions that, when executed by the at least one processor, cause the communication apparatus to:
receive a first signal on a first frequency domain resource and a first time unit, wherein the first signal is a primary synchronization signal or a secondary synchronization signal, the first signal comprises at least two signals including a second signal and a third signal, the second signal is mapped to a second frequency domain resource, the third signal is mapped to a third frequency domain resource, and the second frequency domain resource and the third frequency domain resource are located in the first frequency domain resource; and perform signal detection on the first time unit based on at least one of the at least two signals, wherein the performing signal detection on the first time unit based on at least one of the at least two signal comprises:

generating a fourth signal, wherein when the first signal is a primary synchronization signal, the fourth signal is a primary synchronization signal; and when the first signal is a secondary synchronization signal, the fourth signal is a secondary synchronization signal, wherein the fourth signal comprises at least two signals including a fifth signal and a sixth signal;

mapping the fourth signal to a fourth frequency domain resource, wherein the fifth signal is mapped to a fifth frequency domain resource, the sixth signal is mapped to a sixth frequency domain resource, and the fifth frequency domain resource and the sixth frequency domain resource are located in the fourth frequency domain resource; and performing signal detection on the first time unit based on at least one signal in the first signal and at least one signal in the fourth signal, wherein the mapping the fourth signal to a fourth frequency domain resource comprises:

mapping the fifth signal to the fifth frequency domain resource in a third mapping manner, and mapping the sixth signal to the sixth frequency domain resource in a fourth mapping manner, wherein the third mapping manner is different from the fourth mapping manner.

11. The communication apparatus according to claim 10, wherein the fifth signal and the sixth signal are determined based on a same signal generator or different signal generators.

12. The communication apparatus according to claim 10, wherein the fifth signal and the sixth signal are scrambled signals, and the fifth signal and the sixth signal correspond to different scrambling codes.

13. The communication apparatus according to claim 10, wherein a frequency spacing between the fifth frequency domain resource and the sixth frequency domain resource is a specified value, or is determined based on a frequency band in which the fourth signal is located.

14. The apparatus according to claim 10, wherein the third mapping manner is different from the fourth mapping manner;

when the third mapping manner is in a positive sequence, the fourth mapping manner is in an inverted sequence; and when the third mapping manner is in an inverted sequence, the fourth mapping manner is in a positive sequence.

15. A communication apparatus, comprising:

at least one processor; and at least one storage medium coupled to the at least one processor and storing instructions that, when performed by the at least one processor, cause the communication apparatus to:

determine a first signal, wherein the first signal is a primary synchronization signal or a secondary synchronization signal, the first signal comprises at least two signals, and the at least two signals comprise a second signal and a third signal;

map the first signal to a first frequency domain resource, wherein the second signal is mapped to a second frequency domain resource, the third signal is mapped to a third frequency domain resource, and the second frequency domain resource and the third frequency domain resource are located in the first frequency domain resource; and send the first signal on the first frequency domain resource and a first time unit, wherein the mapping the first signal to a first frequency domain resource comprises;

mapping the second signal to the second frequency domain resource in a first mapping manner, and mapping the third signal to the third frequency domain resource in a second mapping manner, wherein the first mapping manner is different from the second mapping manner, when the first mapping manner is in a positive sequence, the second mapping manner is in an inverted sequence; and when the first mapping manner is in an inverted sequence, the second mapping manner is in a positive sequence.

16. The communication apparatus according to claim 15, wherein the second signal and the third signal are determined based on a same sequence generator or different sequence generators; and/or wherein the second signal and the third signal are scrambled signals, and the second signal and the third signal correspond to different scrambling codes.

* * * * *